(12) United States Patent
Yamashita

(10) Patent No.: US 12,286,910 B2
(45) Date of Patent: Apr. 29, 2025

(54) PUMP STRUCTURE OF INTERNAL COMBUSTION ENGINE

(71) Applicant: NISSAN MOTOR CO., LTD., Yokohama (JP)

(72) Inventor: Shimpei Yamashita, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 268 days.

(21) Appl. No.: 18/169,394

(22) Filed: Feb. 15, 2023

(65) Prior Publication Data

US 2023/0279792 A1    Sep. 7, 2023

(30) Foreign Application Priority Data

Mar. 3, 2022 (JP) ................................ 2022-032238

(51) Int. Cl.
*F01M 1/02* (2006.01)
*F16N 13/22* (2006.01)

(52) U.S. Cl.
CPC .............. *F01M 1/02* (2013.01); *F16N 13/22* (2013.01)

(58) Field of Classification Search
CPC ......... F01M 1/00–08; F01M 2011/007; F01M 11/0004; F16N 13/22; F16N 39/00; F02B 33/44; F04B 17/00
See application file for complete search history.

(56) References Cited

U.S. PATENT DOCUMENTS

| | | | | |
|---|---|---|---|---|
| 4,142,608 A | * | 3/1979 | Sarle ..................... | F01D 25/186 |
| | | | | 417/407 |
| 4,422,295 A | * | 12/1983 | Minami ................... | F02B 39/14 |
| | | | | 184/6.16 |
| 4,752,193 A | * | 6/1988 | Horler ................... | F01D 25/183 |
| | | | | 417/407 |
| 7,360,361 B2 | * | 4/2008 | Prusinski ................ | F01D 25/18 |
| | | | | 417/409 |
| 8,109,365 B2 | * | 2/2012 | Taguchi ............... | F01M 11/064 |
| | | | | 184/6.11 |
| 2008/0277201 A1 | * | 11/2008 | Taguchi ................ | F02B 37/007 |
| | | | | 184/6.5 |
| 2011/0271672 A1 | * | 11/2011 | Donkin ................... | F02B 37/10 |
| | | | | 60/602 |

FOREIGN PATENT DOCUMENTS

JP    2008-280878 A    11/2008

* cited by examiner

*Primary Examiner* — Michael R Mansen
*Assistant Examiner* — Mark K Buse
(74) *Attorney, Agent, or Firm* — Foley & Lardner LLP

(57) ABSTRACT

An oil structure of an internal combustion engine includes a main oil pump configured to suck lubricating oil stored in a crankcase and feed the lubricating oil to respective engine parts and a scavenge pump configured to recover the lubricating oil from any lubricated engine part and return the lubricating oil into the crankcase. The scavenge pump has: an oil suction passage extending from the lubricated engine part to a suction side of the scavenge pump; and an air introduction passage for negative pressure control connected to the oil suction passage. An air introduction port of the air introduction passage is open to the inside of the crankcase and is set to a height position such that, when a level of the lubricating oil in the crankcase is inclined, the lubricating oil flows in from the air introduction port and returns from the scavenge pump into the crankcase.

9 Claims, 5 Drawing Sheets

PUMP STRUCTURE OF INTERNAL COMBUSTION ENGINE

FIELD OF THE INVENTION

The present invention relates to a pump structure of an internal combustion engine, particularly of the type having a scavenge pump that forcefully recovers used lubricating oil from any lubricated part of the internal combustion engine.

BACKGROUND OF THE INVENTION

Japanese Laid-Open Patent Publication No. 2008-280878 (hereinafter referred to as JP 2008-280878 A) discloses a lubrication system for a vehicle internal combustion engine, in which a scavenge pump is arranged to forcefully recover used lubricating oil from a bearing part of a supercharger through a recovery pipe such that the lubricating oil supplied to the bearing part of the turbocharger can be prevented from overflowing toward the turbine side or compressor side. In the lubrication system of JP 2008-280878 A, an air introduction pipe with an orifice is connected to the recovery pipe so as to introduce air into the recovery pipe and thereby control the suction side of the scavenge pump to an adequate negative pressure condition. Regardless of the vehicle running state, an open end portion of the air introduction pipe is held in a high position above the oil level at all times.

SUMMARY OF THE INVENTION

In general, the internal combustion engine is equipped with an oil pump so that lubricating oil is supplied by the oil pump to various parts of the internal combustion engine. More specifically, the oil pump is configured to suck lubricating oil stored in a bottom portion of a crankcase and feed the lubricating oil to the respective engine parts through so-called oil galleries. In this configuration, there is a problem that, when the vehicle body is largely inclined, a suction port of the oil pump (usually provided at an upstream end of an oil strainer) is exposed upward from the oil level whereby the oil pump is temporarily disabled to suck the lubricating oil. In such a disabled state of the oil pump, the scavenge pump as disclosed in JP 2008-280878 A makes no contribution to the supply of the lubricating oil.

In view of the foregoing, the present invention provides a pump structure of an internal combustion engine, comprising:
a main oil pump disposed at a lower portion of the internal combustion engine and configured to suck lubricating oil stored in a bottom portion of a crankcase of the internal combustion engine and feed the lubricating oil to respective parts of the internal combustion engine; and
a scavenge pump disposed at a lower portion of the internal combustion engine and configured to recover the lubricating oil after use from any lubricated part among the respective parts of the internal combustion engine and return the lubricating oil to the inside of the crankcase,
the scavenge pump comprising: an oil suction passage extending from the lubricated part to a suction side of the scavenge pump; and an air introduction passage for negative pressure control connected to the oil suction passage at a position between the lubricated part and the suction side of the scavenge pump,
the air introduction passage having at an end thereof an air introduction port set to a height position such that the air introduction port is open to the inside of the crankcase and such that, when an oil level of the lubricating oil in the bottom portion of the crankcase is inclined, the lubricating oil flows in from the air introduction port and returns from the scavenge pump to the inside of the crankcase.

Herein, inclination of the oil level refers to relative inclination of the oil level with respect to the crankcase etc.

DESCRIPTION OF EMBODIMENTS

Hereinafter, exemplary embodiments of the present invention will be described below with reference to the drawings.

Figure 1:
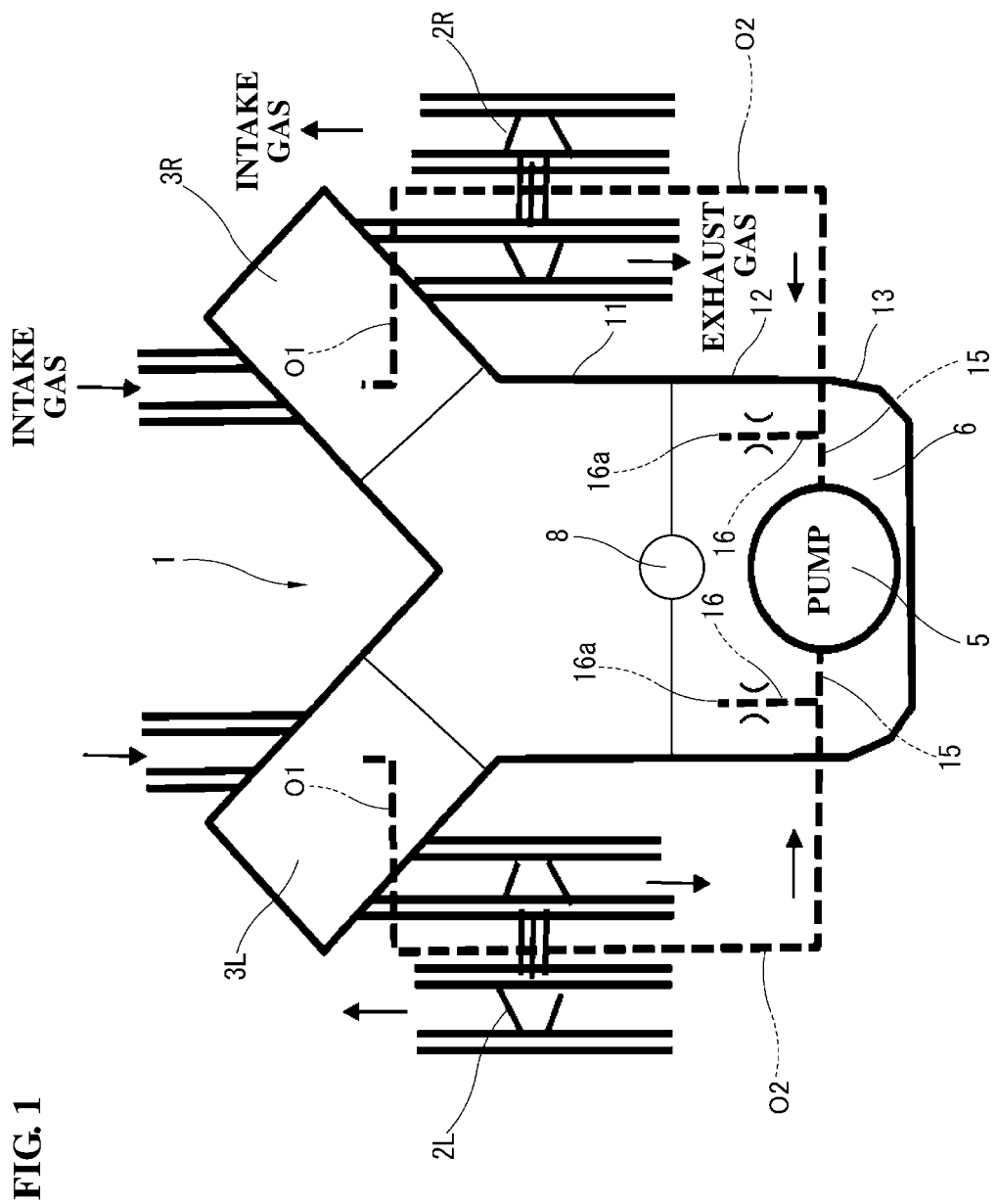
FIG. 1 is a schematic configuration view of a V-type internal combustion engine with a pump structure according to a first embodiment of the present invention.
Figure 2:
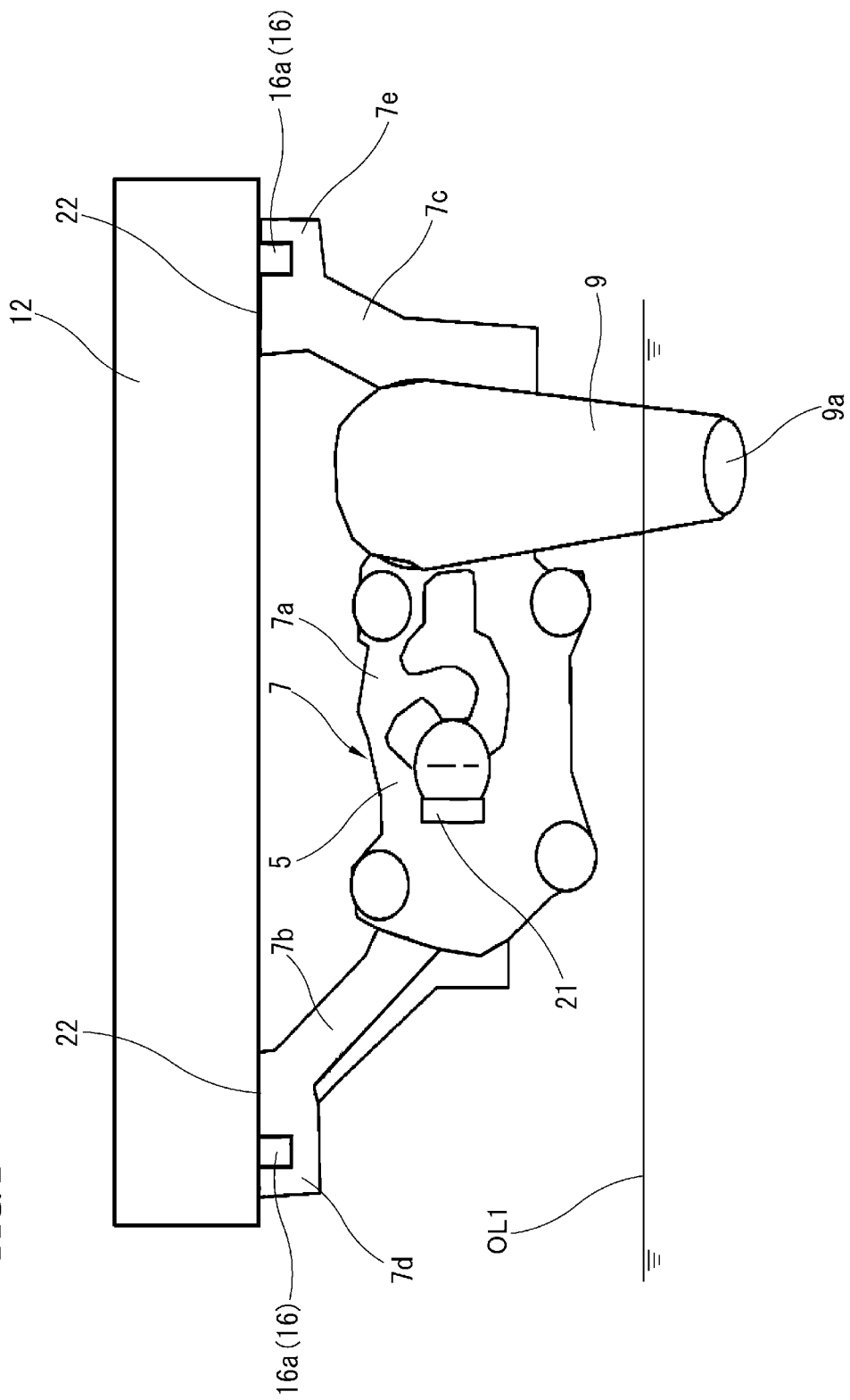
FIG. 2 is a plan view of a main part of the pump structure, including a scavenge pump, according to the first embodiment of the present invention.

FIG. 1 is a schematic configuration view of a V-type six-cylinder internal combustion engine 1 for a vehicle to which a pump structure according to a first embodiment of the present invention is applied. FIG. 2 is a plan view of a main part of the pump structure according to the first embodiment of the present invention. In the first embodiment, the internal combustion engine 1 is mounted to the vehicle in a so-called longitudinal position. As shown in FIG. 1, turbochargers 2L, 2R as superchargers are respectively disposed on outer sides of left and right banks of the internal combustion engine 1. Lubricating oil is supplied to bearing parts of the turbochargers 2 from appropriate parts of the internal combustion engine 1, such as cylinder heads 3L, 3R of the left and right banks, as indicated by broken lines O1.

As the pump structure, a scavenge pump 5 and a main oil pump are disposed at a lower portion of the internal combustion engine 1. These pumps are placed in a crankcase 6. In the first embodiment, the scavenge pump 5 and the main oil pump are combined into one unit by being covered by a housing 7 (see FIG. 2). More specifically, a pump mechanism of the scavenge pump 5 and a pump mechanism of the main oil pump are entirely covered by the housing 7 and are arranged in tandem (in series) with each other within the housing 7 so as to be driven and rotated by one common rotation shaft. By transfer of power from a crankshaft 8 to the rotation shaft via a chain mechanism (not shown), both of the scavenge pump 5 and the main oil pump are driven at all times during rotation operation of the internal combustion engine 1.

The lubricating oil is stored in a bottom portion of the crankcase 6. The main oil pump is configured to suck the lubricating oil stored in the bottom portion of the crankcase 6 and feed the lubricating oil to various parts of the internal combustion engine 1 through so-called oil galleries. As is well known, the lubricating oil is used to lubricate the respective parts of the internal combustion engine 1 such as those of a piston-crank mechanism including the crankshaft 8 and those of a valve drive mechanism mounted to the cylinder head 3L, 3R. Further, a part of the lubricating oil is also used for cooling purposes. The lubricating oil used in the cylinder head 3L, 3R and the like is basically recovered and returned to the bottom portion of the crankcase 6 by flowing into the crankcase 6 under its own weight.

As shown in FIG. 2, the main oil pump has an oil strainer 9 on a suction side thereof. The oil strainer 9 is formed of a synthetic resin etc. in a cylindrical shape and is connected to a suction portion of the main oil pump mechanism in the housing 7. An open lower-side (upstream) end of the oil strainer 9, which is directed to the bottom of the crankcase 6, substantially serves as a suction port 9a of the main oil pump so that the main oil pump sucks the lubrication oil from the suction port 9a.

In the first embodiment, the body of the internal combustion engine 1 is constituted by: a cylinder block 11 having six cylinders arranged in a V-configuration; and a ladder frame 12 mounted to a lower side of the cylinder block 11 as shown in FIG. 1. An oil pan 13 is attached to a lower side of the ladder frame 12. As in the case of the cylinder block 11, the ladder frame 12 is formed by die casting of an aluminum alloy etc. The ladder frame 12 includes: a pair of lateral wall portions extending in a front-rear direction of the internal combustion engine 1 and continuing to a skirt portion of the cylinder block 11; and a plurality of bearing cap portions extending in a width direction of the internal combustion engine 1 so as to connect the pair of lateral wall portions to each other at positions between the cylinders and at front and rear end positions. The pair of lateral wall portions and the plurality of bearing cap portions are integrally formed by casting. Accordingly, the ladder frame 12 and the cylinder block 11 correspond to a body constituting part which constitutes the body of the internal combustion engine 1 in the first embodiment. The crankshaft 8 is rotatably supported between a bulk head of the cylinder block 11 and the bearing cap portions of the ladder frame 12. The space inside the crankcase 6, in which the crankshaft 8 and connecting rods move respectively, is defined by three parts: the skirt portion of the cylinder block 11, the ladder frame 12 and the oil pan 13.

The scavenge pump 5 is configured to forcefully recover the lubricating oil after use from the bearing parts (as lubricated parts) of the turbochargers 2 and return the recovered lubricating oil to the inside of the crankcase 6 as indicated by broken lines O2 in FIG. 1. In the first embodiment, the scavenge pump 5 is in the form of a trochoid pump. Alternatively, any other type of pump can be used as the scavenge pump 5.

The scavenge pump 5 has a pair of oil suction passages 15 and a pair of air introduction passages 16 for negative pressure control. The oil suction passages 15 are each connected to a suction side of the scavenge pump 5 and extend to and communicate with the respective bearing parts of the turbochargers 2L, 2R on the left and right banks of the internal combustion engine. The air introduction passages 16 are respectively connected to the oil suction passages 15 at positions between the bearing parts and the suction side of the scavenge pump 5 as schematically shown in FIG. 1. The passage areas of the air introduction passages 16 are set such that each of the air introduction passages 16 serves as a kind of orifice to achieve an adequate air flow rate or pressure difference. Air introduction ports 16a are formed on respective upstream ends of the air introduction passages 16 and are open to the inside of the crankcase 6. These two air introduction ports 16a are arranged at positions away from the rotation center of the crankshaft 8 in the width direction of the internal combustion engine 1 and closer to the opposed lateral walls of the crankcase 6.

Herein, the oil suction passages 15 are respectively directed toward the left and right sides in correspondence with the left and right banks of the internal combustion engine; and the air introduction ports 16a are located on the same side of these left and right oil suction passages 15.

The configuration of the scavenge pump 5 with the air introduction passages 16 according to the first embodiment will be now explained in more detail below with reference to FIGS. 2 and 3.

FIG. 2 is a plan view of the main part of the pump structure, showing the housing 7 in which the scavenge pump 5 and the main oil pump are accommodated, as viewed in an axial direction of the crankshaft 8, and more specifically, as viewed inside the crankcase 6 in the direction from the rear toward the front of the internal combustion engine 1. In FIG. 2, the ladder frame 12 is illustrated in a simplified manner for the sake of explanation. As mentioned above, the pump mechanism of the scavenge pump 5 and the pump mechanism of the main oil pump are in a tandem arrangement. The pump mechanism of the scavenge pump 5 is situated on the relatively front side in the figure (i.e. on the rear side in the front-rear direction of the internal combustion engine 1), whereas the pump mechanism of the main oil pump is situated in back of the scavenge pump 5 in the figure (i.e. on the front side in the front-rear direction of the internal combustion engine 1). A discharge port 21 is formed at a substantially center position on an end portion of the scavenge pump 5 so that the lubricating oil discharged from the discharge port 21 flows back to the bottom portion of the crankcase 6. The oil strainer 9 of the main oil pump extends from a position adjacent to the end portion of the scavenge pump 5, with the suction port 9a being open toward the lower side.

The housing 7 includes: a center portion 7a in which the pump mechanisms are placed; left and right wing portions 7b and 7c extending diagonally upward from left and right sides of the center portion 7a; and mounting flange portions 7d and 7e provided on respective distal ends of the wing portions 7b and 7c and each having an elongated shape extending in the axial direction of the crankshaft 8. By a plurality of bolts (not shown) inserted through the mounting flange portions 7d and 7e and screwed into the ladder frame 12, the mounting flange portions 7d and 7e are mounted to the lower side of the ladder frame 12 in the figure (i.e. the frontmost end side of the ladder frame 12 in the front-rear direction of the internal combustion engine 1). With this, the housing 7 is fixed to the ladder frame 12. A mounting surface of the ladder frame 12 and mounting surfaces 22 (see FIG. 3) of the mounting flange portions 7d and 7e are each formed as a flat surface by machining, and are brought into close contact with each other so as to ensure sufficient oil tightness and air tightness.

The left- and right-side oil suction passages 15, which communicate at one (downstream) ends thereof with the suction side of the scavenge pump 5, are formed to through the wing portions 7d and 7e, respectively. These oil suction passages 15 extend through the mounting surfaces of the ladder frame 12 and the mounting flange portions 7d, 7e and communicate at the other (upstream) ends thereof with the bearing parts of the turbocharger 12 via oil suction passages in the ladder frame 12 and in the cylinder block 11 as explained above with reference to FIG. 1.

Figure 3:
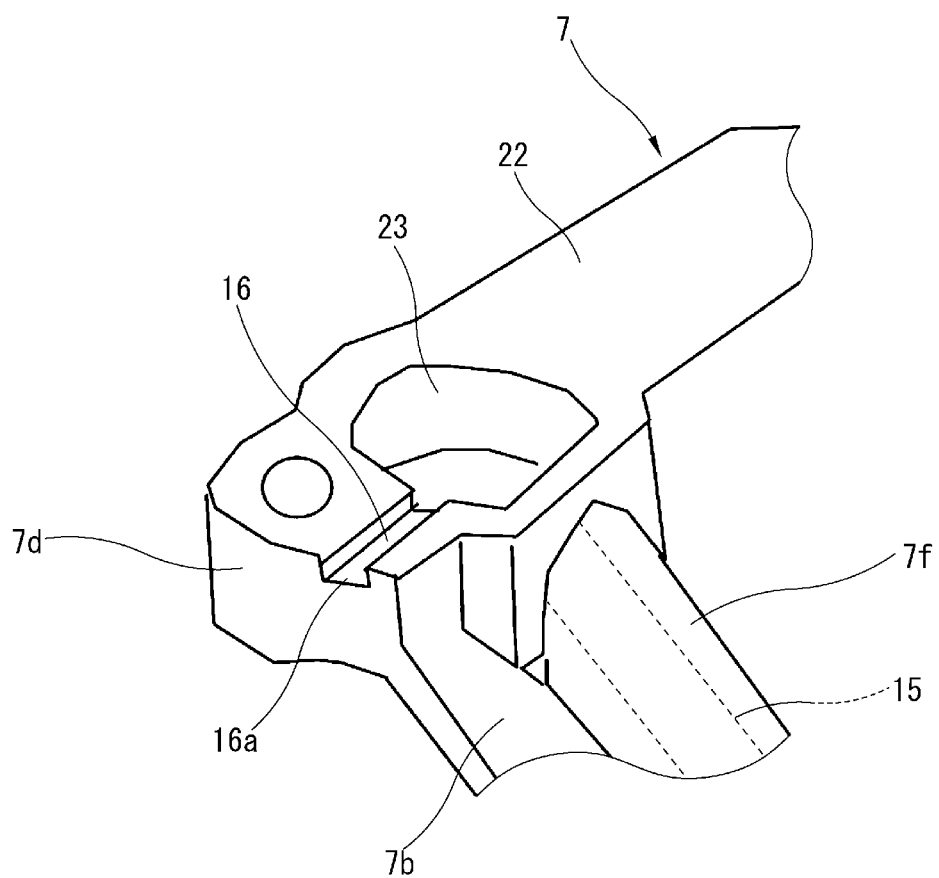
FIG. 3 is a perspective view of a mounting flange portion of a housing of the pump structure according to the first embodiment of the present invention.

FIG. 3 is a perspective view of a main part of the mounting flange portion 7d. It is noted that, since the configuration of the mounting flange portion 7e is the same as that of the mounting flange portion 7d, the following explanation of the mounting flange portion 7d also applies to the mounting flange portion 7e. As shown in FIG. 3, an expanding section 7f is provided on a rear end region of the diagonally extending wing portion 7b so as to define therein a conduit. The oil suction passage 15 is formed to extend through the inside of the expanding section 7f. Herein, the housing 7 is formed as a cast of aluminum alloy etc.; and the oil suction passage 15 is formed by casting or drilling. A recess 23 is formed in a region of the mounting surface 22 of the mounting flange portion 7d to which the upstream end of the oil suction passage 15 is open. The recess 23 has an opening area larger than the cross-sectional passage area of the oil suction passage 15 and serves as an oil pool. The oil suction passage (not shown) extending vertically in the ladder frame 12 and the oil suction passage 15 extending in the housing 7 are connected to each other through the space inside the recess 23.

As shown in FIG. 3, the air introduction passage 16 is formed in a rectangular cross-section groove shape in a rear end region of the mounting flange portion 7d adjacent to the recess 23. For example, the air introduction passage 16 is defined as a rectangular cross-section passage by machining a groove linearly in the mounting surface 22 of the mounting flange portion 7d and bringing the mounting surface 22 of the mounting flange portion 7d into close contact with the mounting surface of the ladder frame 12. This air introduction passage 16 has one end as the air introduction port 16a open toward the inside of the crankcase 6 and the other end open to the recess 23. In the first embodiment, the groove constituting the air introduction passage 16 is provided in the axial direction of the crankshaft 8 (i.e. in the front-rear direction of the internal combustion engine 1) so that the air introduction port 16a is open in the axial direction of the crankshaft 8. In this way, the air introduction passage 16 is formed in a groove shape in the mounting surface 22 of the mounting flange portion 7d. It is thus easy to form the air introduction passage 16 and easy to ensure the adequate cross-sectional passage area of the air introduction passage 16 as a kind of orifice.

In FIG. 2, OL1 represents the level of the lubricating oil in the case where the vehicle with the longitudinally mounted internal combustion engine 1 is in a horizontal orientation (e.g. running or stopping on a horizontal flat road). This corresponds to the height position of the oil level during operation. As shown in FIG. 2, each of the air introduction ports 16a is positioned higher than the oil level OL1 and is open to the inside of the crankcase 6 when the vehicle is in a horizontal orientation, that is, when the internal combustion engine 1 in a horizontal orientation. In this state, air is introduced moderately from the air introduction ports 16 into the oil suction passages 15 such that the oil suction passage 15 (the suction side of the scavenge pump 5) is controlled to and maintained at an adequate negative pressure condition.

Since the air introduction port 16a is open in the axial direction of the crankshaft 8, only air is introduced from the air introduction port 16a into the oil suction passage 15 without flying oil mist caused by rotation of the crankshaft 8 directly entering the air introduction port 16a.

On the other hand, the suction port 9a of the main oil pump (oil strainer 9) is positioned lower than the oil level OL1 and sinks in the lubricating oil when the vehicle is in a horizontal orientation. Thus, the lubricating oil is sucked by the main oil pump and fed from the main oil pump to the respective parts of the internal combustion engine 1.

Figure 4:
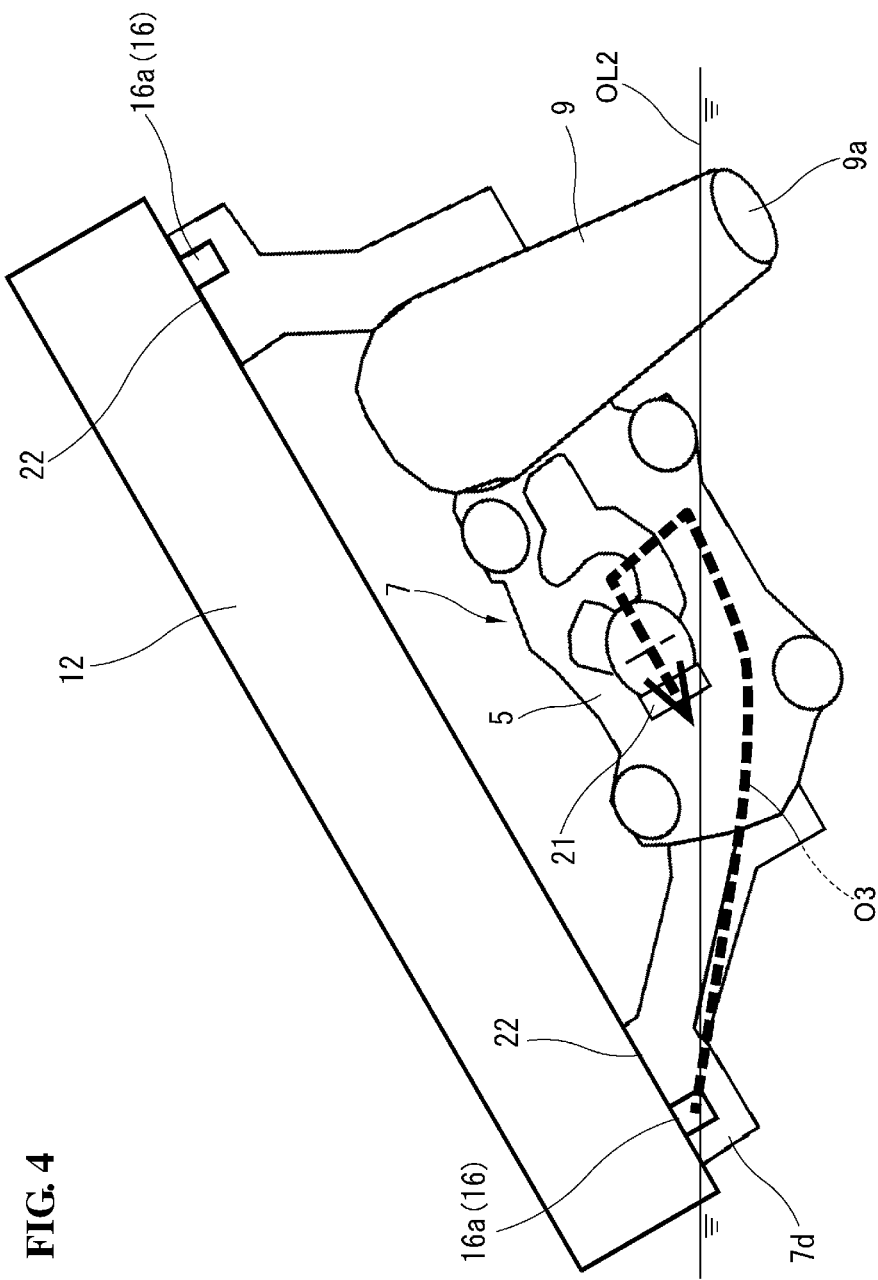
FIG. 4 is a schematic view showing a change of oil level caused by inclination of the internal combustion engine.

FIG. 4 is a schematic view showing the positional relationship of the air introduction ports 16a and the oil level OL2 in the case where the vehicle with the longitudinally mounted internal combustion engine 1 is inclined to the left or right side during operation. In the inclined state shown in FIG. 4, the oil level OL2 just reaches one of the air introduction ports 16a; and the suction port 9a of the main oil pump (oil strainer 9) is positioned slightly lower than the oil level OL2. If the oil level OL2 is inclined more than that shown in FIG. 4, the suction port 9a is exposed upward from the oil level OL2 so that it becomes difficult or impossible for the main oil pump to suck the lubricating oil.

In the case where the internal combustion engine 1 is inclined relatively largely such that the oil level OL2 reaches the height position of the air introduction port 16a as mentioned above, the lubricating oil in the vicinity of the air introduction port 16a flows in from the air introduction port 16a in the first embodiment. The lubricating oil flowing in from the air introduction port 16a is sucked into the scavenge pump 5 through the air introduction passage 16 and the oil suction passage 15 and then returned from the discharge port 21 to the inside of the crankcase 6 by the action of the scavenge pump 5 as indicated by broken line O3 in FIG. 4.

Herein, it is preferable that, the discharge port 21 of the scavenge pump 5 is positioned higher than the oil level O2 in the inclined state as shown in FIG. 4. It is further preferable that, in the inclined state as shown in FIG. 4, the air introduction port 16a from which the lubricating oil flows in is positioned higher than the suction port of the scavenge pump 5.

As explained above, the scavenge pump 5 performs the function of recovering the lubricating oil in the crankcase 6 from one of the air introduction ports 16a and returning the recovered lubricating oil to the inside of the crankcase 6, so as to suppress a change of the oil level, when the oil level is inclined as shown in FIG. 4 due to inclination of the vehicle body. It is therefore less likely that the oil level OL2 will rise to a higher position than the air introduction port 16a, whereby a further rise of the oil level OL2 (that is, relative inclination of the oil level OL2) is at least partially suppressed. As a result, it is less likely that the suction port 9a of the oil strainer 9 will be exposed upward from the oil level even when the vehicle is inclined. This enables the main oil pump to more reliably continue suction and supply of the lubricating oil for lubrication of the respective engine parts.

It is herein preferable that the air introduction port 16a and the suction port 9a of the oil strainer 9 of the main oil pump are in a positional relationship that, when the oil level OL2 reaches the air introduction port 16a due to inclination of the internal combustion engine 1, the suction port 9a is not yet exposed from the oil level OL2 (that is, the whole of the suction port 9a is positioned lower than the oil level OL2). In other words, the positional relationship of the air introduction port 16a and the suction port 9a of the oil strainer 9 of the main oil pump is preferably set such that, when the internal combustion engine 1 is inclined about the crankshaft 8, the relatively inclined oil level OL2 reaches the air introduction port 16a before the suction port 9a is exposed therefrom.

The same applies in the case where the oil level is inclined opposite to that shown in FIG. 4. When the oil level reaches the other air introduction port 16a, the lubricating oil flows in from the other air introduction port 16a and then returns to the inside of the crankcase 6 by the action of the scavenge pump 5 in the same manner as mentioned above.

It is therefore possible to obtain the same effects when the internal combustion engine 1 is inclined to either of the left and right sides. It is possible to obtain the same effects not only when the vehicle (internal combustion engine 1) is inclined but also when the oil level is inclined under a centrifugal force during e.g. cornering of the vehicle.

Although the present invention has been described by way of the above specific embodiment, the present invention is not limited to the above-described embodiment. Various modification and variation of the embodiment described above will occur to those skilled in the art in light of the above teaching.

For example, the present invention is applicable to not only the V-type internal combustion engine 1 as in the above-described first embodiment but also any other type of internal combustion engine such as in-line multi-cylinder internal combustion engine.

Figure 5:
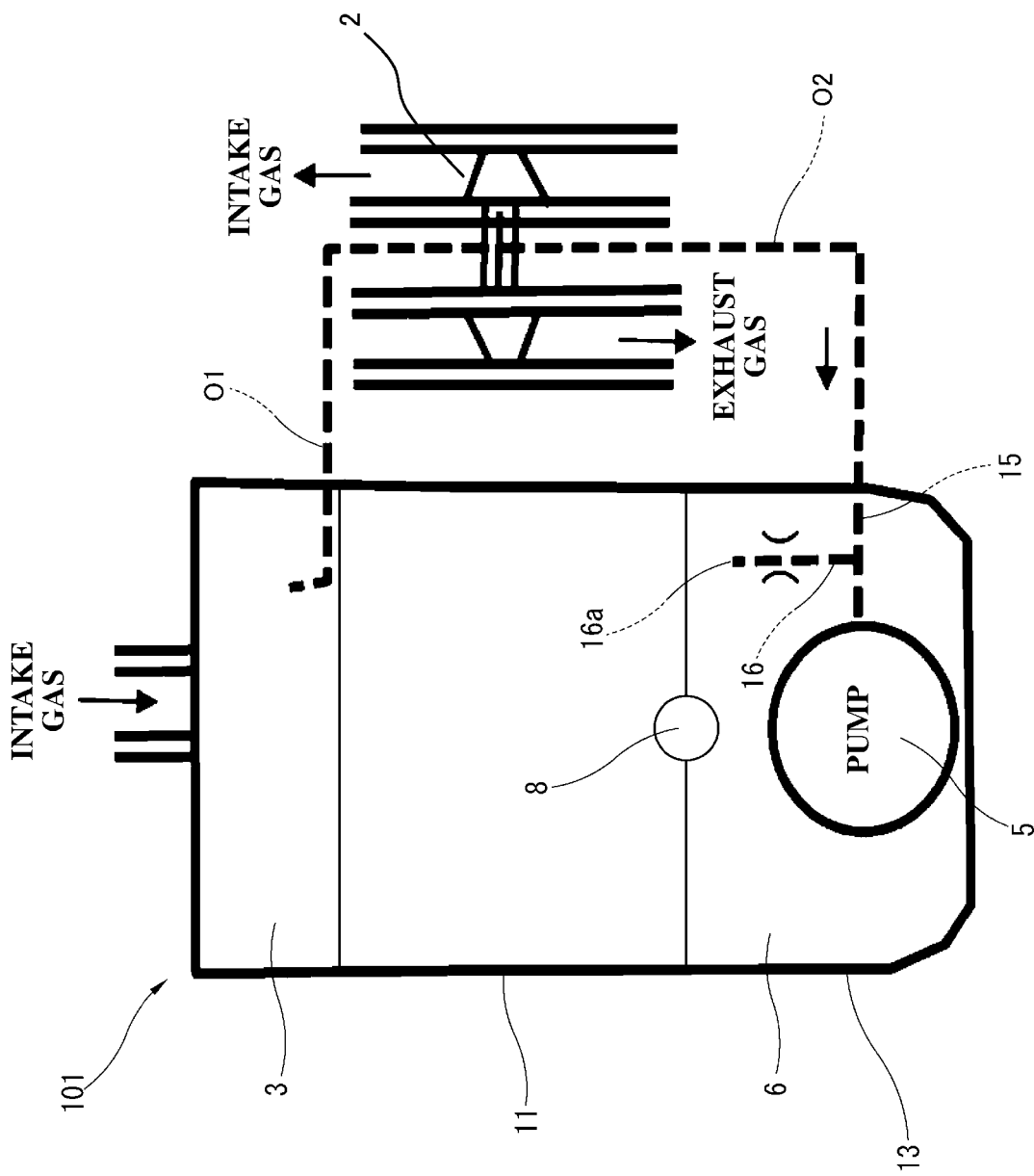
FIG. 5 is a schematic configuration view of an in-line multi-cylinder internal combustion engine with a pump structure according to a second embodiment of the present invention.

FIG. 5 is a schematic configuration view of an in-line multi-cylinder internal combustion engine 101 for a vehicle to which a pump structure according to a second embodiment of the present invention is applied. In FIG. 5, the same reference numerals are used to denote the same parts and portions as those shown in FIGS. 1 to 4, and a detailed description of those parts and portions will be omitted herefrom.

In the second embodiment, the scavenge pump 5 is configured to forcefully recover lubricating oil after use from the bearing part (as lubricated part) of the turbocharger 2 and return the recovered lubricating oil into the crankcase 6 as in the case of the first embodiment. The air introduction passage 16 is connected to the oil suction passage 15 of the scavenge pump 5 at a position between the bearing part of the turbocharger 2 and the suction side of the scavenge pump 5. The air introduction port 16a is formed at the upstream end of the air introduction passage 16. When the vehicle is in a horizontal orientation, the air introduction port 16a is positioned higher than the oil level of the lubricating oil in the crankcase 6 so that air is introduced from the air introduction port 16a into the oil suction passage 15. When the oil level is inclined to a certain large degree due to e.g. inclination of the vehicle body and reaches the air introduction port 16a, on the other hand, the scavenge pump 5 performs the function of recovering the lubricating oil in the crankcase 6 from the air introduction port 16a and returning the recovered lubricating oil to the inside of the crankcase 6 so as to suppress a further change of the oil level. This enables more reliable suction and supply of the lubricating oil by the main oil pump.

Although the scavenge pump 5 is configured to recover the lubricating oil from the bearing part (as lubricated part) of the turbocharger 2 in the above-described first and second embodiments, the present invention is not limited to such a configuration. The present invention is also applicable to the case where the scavenge pump 5 is configured to recover the lubricating oil from any other lubricated part of the internal combustion engine.

Furthermore, the main oil pump can be disposed at any arbitrary position.

The entire contents of Japanese Patent Application No. 2022-032238 (filed on Mar. 3, 2022) are herein incorporated by reference. The scope of the present invention is defined with reference to the following claims.

The invention claimed is:

1. A pump structure of an internal combustion engine, comprising:
    a main oil pump disposed at a lower portion of the internal combustion engine and configured to suck lubricating oil stored in a bottom portion of a crankcase of the internal combustion engine and feed the lubricating oil to respective parts of the internal combustion engine; and
    a scavenge pump disposed at a lower portion of the internal combustion engine and configured to recover the lubricating oil after use from any lubricated part among the respective parts of the internal combustion engine and return the lubricating oil to the inside of the crankcase,
    the scavenge pump comprising: an oil suction passage extending from the lubricated part to a suction side of the scavenge pump; and an air introduction passage for negative pressure control connected to the oil suction passage at a position between the lubricated part and the suction side of the scavenge pump,
    the air introduction passage having at an end thereof an air introduction port set to a height position such that the air introduction port is open to the inside of the crankcase and such that, when an oil level of the lubricating oil in the bottom portion of the crankcase is inclined, the lubricating oil flows in from the air introduction port and returns from the scavenge pump to the inside of the crankcase.

2. The pump structure of the internal combustion engine according to claim 1,
    wherein the air introduction port is arranged at a position away from a rotation center of a crankshaft of the internal combustion engine in a width direction of the internal combustion engine and closer to either one or both of lateral wall portions of the crankcase.

3. The pump structure of the internal combustion engine according to claim 2,
    wherein the main oil pump comprises an oil strainer, and
    wherein the air introduction port and a suction port of the oil strainer are in a positional relationship that, when the internal combustion engine is inclined about the crankshaft, the oil level reaches the air introduction port before the suction port of the oil strainer is exposed from the oil level.

4. The pump structure of the internal combustion engine according to claim 2,
    wherein the oil suction passage extends from the scavenge pump in the width direction of the internal combustion engine, and
    wherein the air introduction passage is connected to the oil suction passage, with the air introduction port of the air introduction passage being away from the scavenge pump in the width direction of the internal combustion engine.

5. The pump structure of the internal combustion engine according to claim 1, comprising a housing mounted to a lower side of a body constituting part of the internal combustion engine and accommodating therein the scavenge pump,
    wherein the oil suction passage is formed to extend in the housing and in the body constituting part through mounting surfaces of the housing and the body constituting part, and
    wherein the air introduction passage is formed in a groove shape in the mounting surface of the housing and has one end communicating with the oil suction passage and the other end open to serve as the air introduction port.

6. The pump structure of the internal combustion engine according to claim 5,
wherein the air introduction port is open in an axial direction of a crankshaft of the internal combustion engine.

7. The pump structure of the internal combustion engine according to claim 1,
wherein the internal combustion engine is a V-type internal combustion engine and is mounted to a vehicle in a longitudinal position, and
wherein the scavenge pump comprises a pair of air introduction ports so as to, when the vehicle is inclined a left side or right side, allow the lubricating oil to flow in from either one of the air introduction ports.

8. An internal combustion engine comprising the pump structure according to claim 1.

9. A pump structure of an internal combustion engine, comprising:
a main oil pump mechanism for sucking lubricating oil stored in a bottom portion of a crankcase of the internal combustion engine and feeding the lubricating oil to respective parts of the internal combustion engine;
a scavenge pump mechanism for recovering the lubricating oil from any lubricated part among the respective parts of the internal combustion engine and returning the lubricating oil into the crankcase of the internal combustion engine,
an oil suction passage for allowing the lubricating oil to flow therethrough from the lubricated part to a suction side of the scavenge pump; and
an air introduction passage for introducing air into the oil suction passage so as to control the suction side of the scavenge pump to a negative pressure condition,
wherein an air introduction port of the air introduction passage is open to the inside of the crankcase and is positioned to allow, when an oil level of the lubricating oil in the bottom portion of the crankcase is inclined to reach the air introduction port, the lubricating oil to flow in from the air introduction port such that the lubricating oil is sucked into the scavenge pump through the air introduction passage and the oil suction passage and returned into the crankcase by the action of the scavenge pump.

\* \* \* \* \*